No. 827,956.

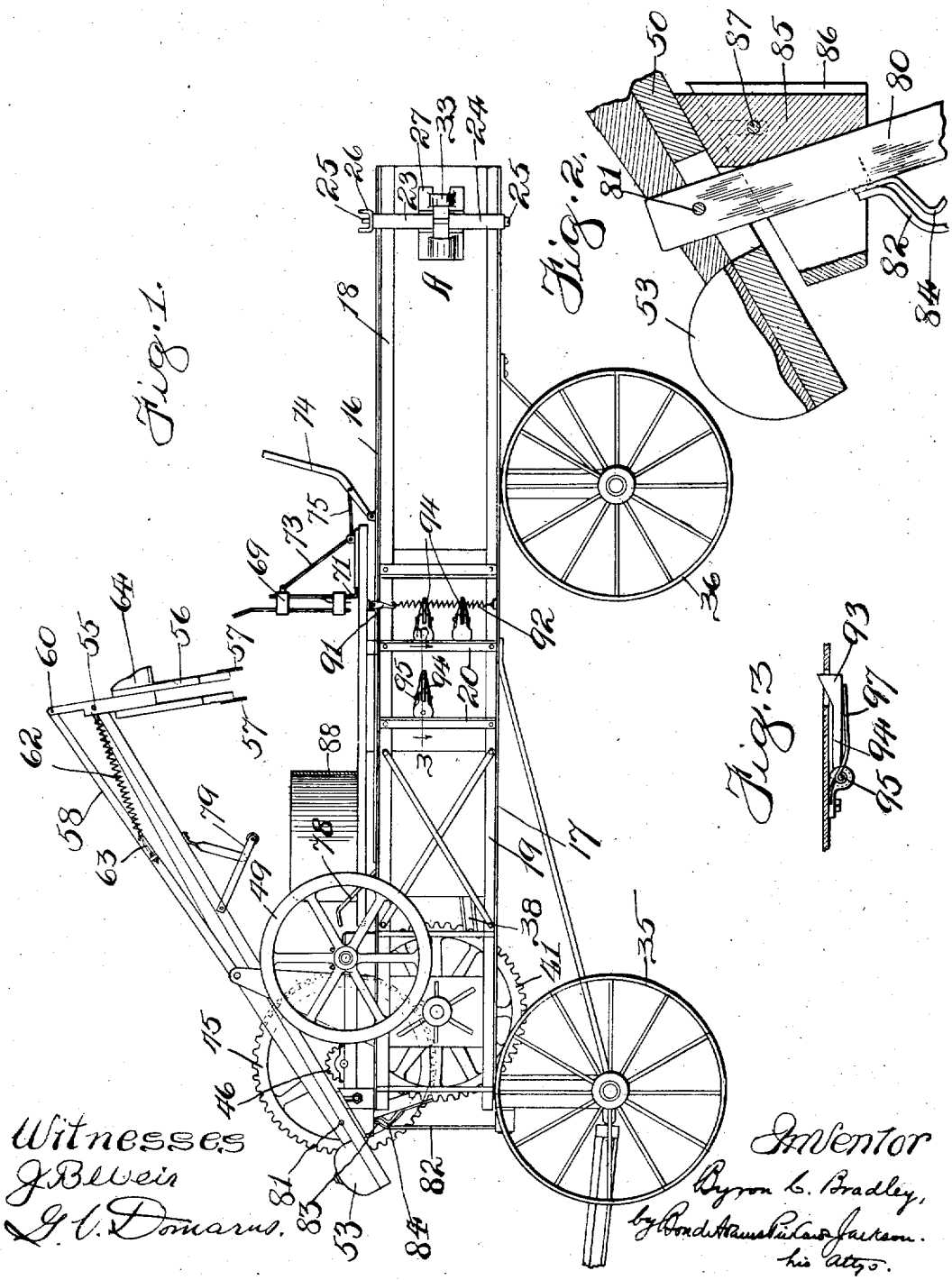

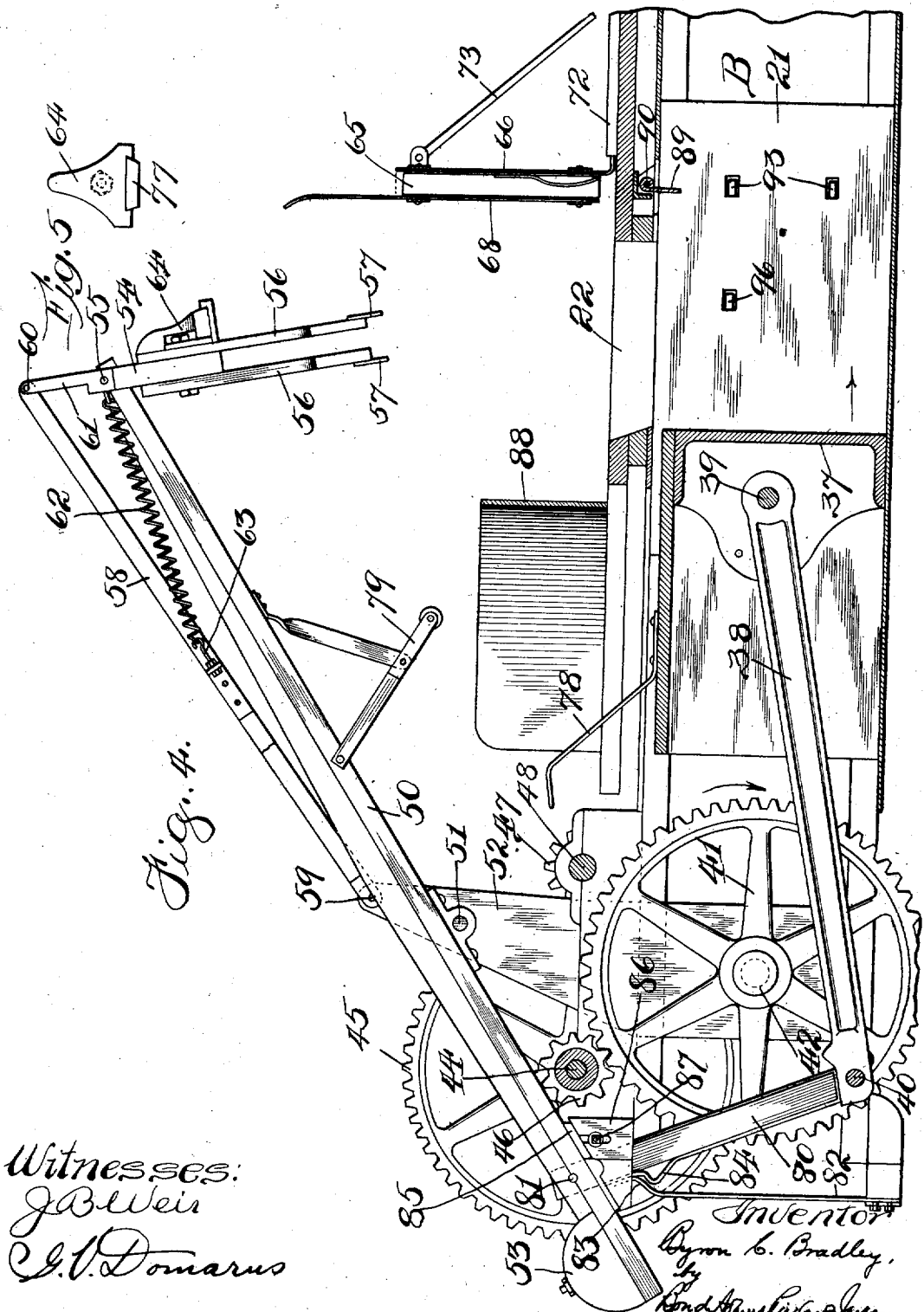

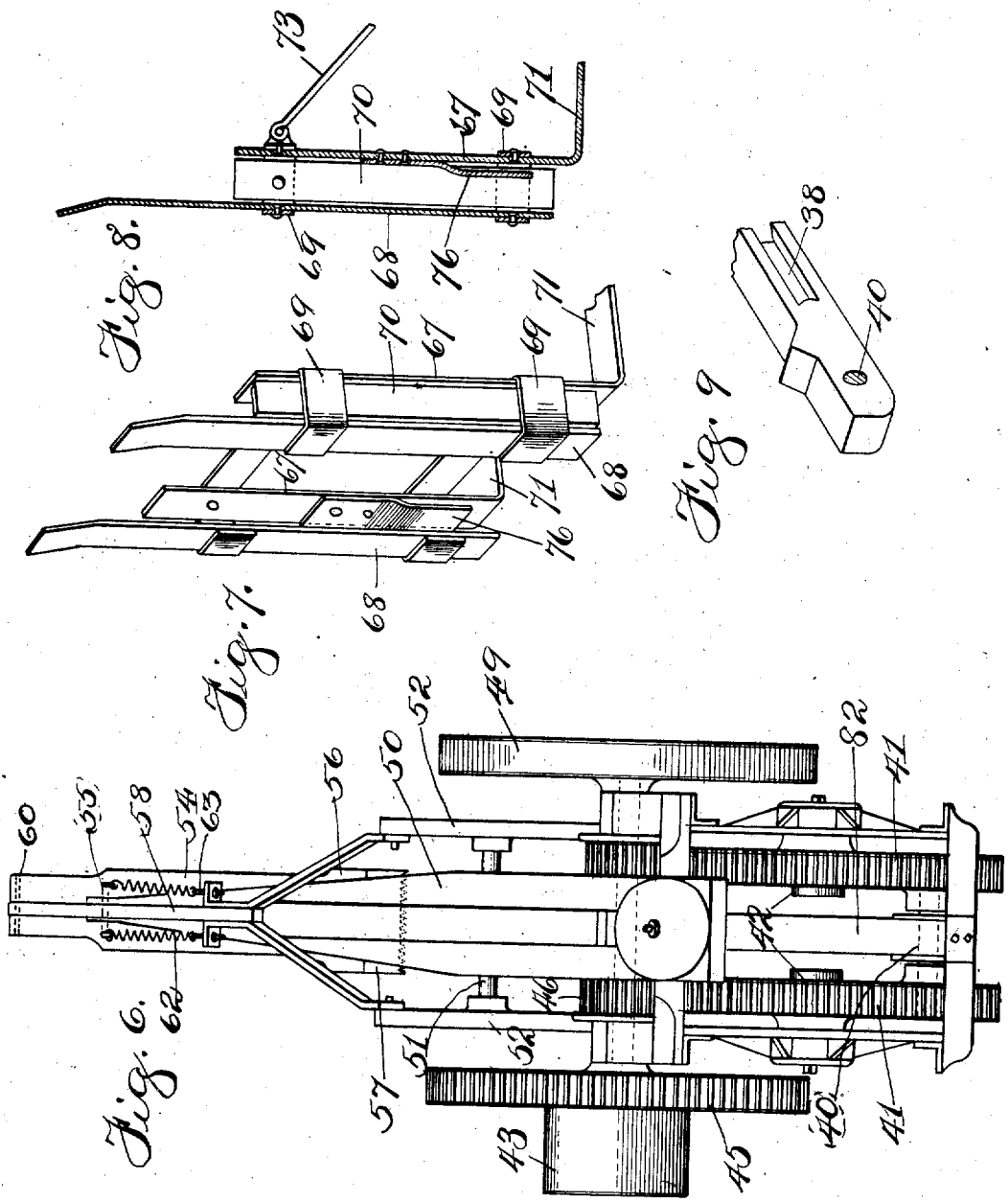

PATENTED AUG. 7, 1906.

B. C. BRADLEY.
HAY PRESS.
APPLICATION FILED AUG. 27, 1904.

5 SHEETS—SHEET 4.

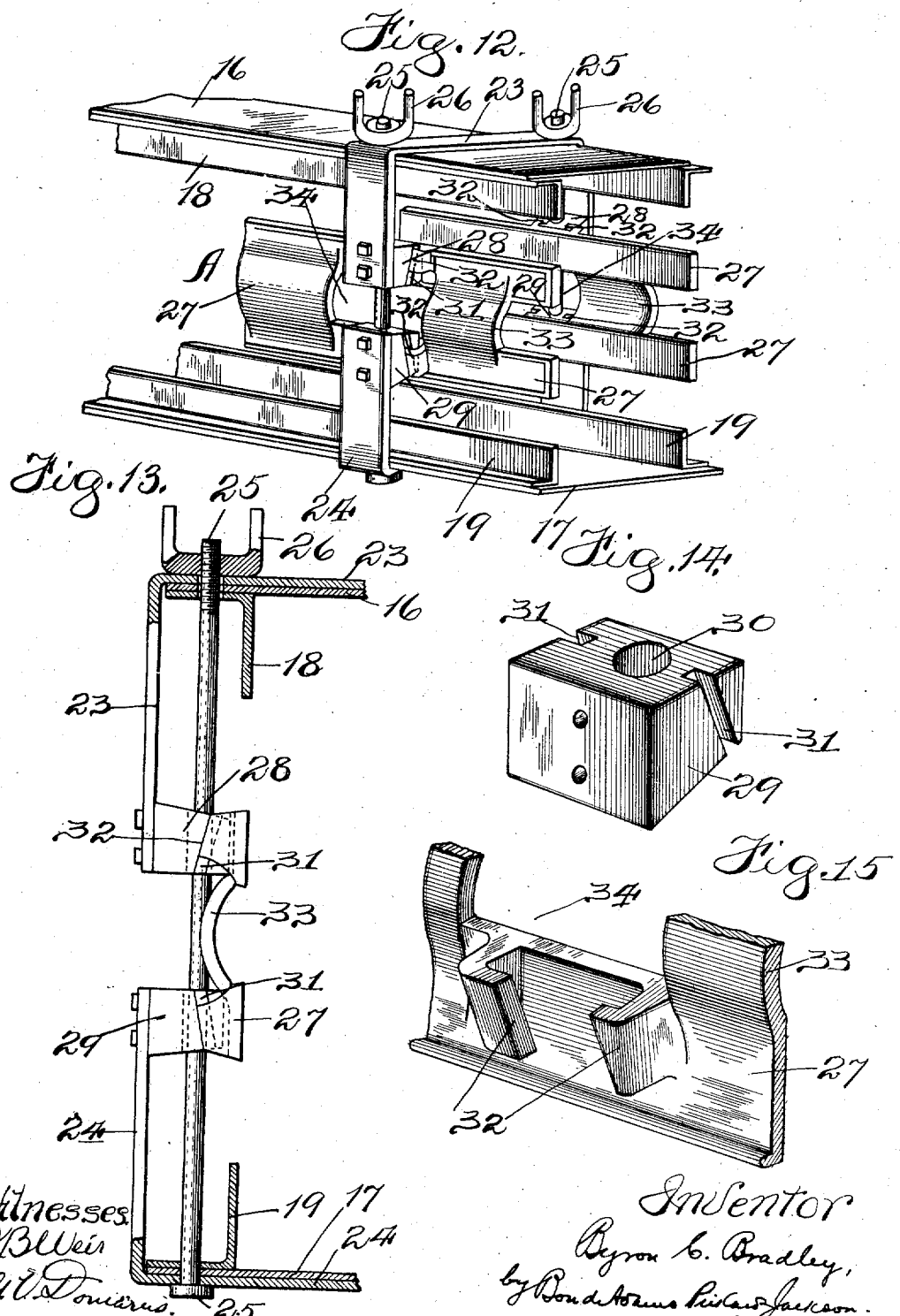

UNITED STATES PATENT OFFICE.

BYRON C. BRADLEY, OF BRADLEY, ILLINOIS, ASSIGNOR TO DAVID BRADLEY MANUFACTURING COMPANY, OF CHICAGO, ILLINOIS, A CORPORATION OF ILLINOIS.

HAY-PRESS.

No. 827,956.     Specification of Letters Patent.     Patented Aug. 7, 1906.

Application filed August 27, 1904. Serial No. 222,361.

*To all whom it may concern:*

Be it known that I, BYRON C. BRADLEY, a citizen of the United States, and a resident of Bradley, in the county of Kankakee and State of Illinois, have invented certain new and useful Improvements in Hay-Presses, of which the following is a specification, reference being had to the accompanying drawings.

My invention relates to hay-presses, and in great part it has to do with presses in which the hay is compressed in a compression-chamber by means of a reciprocating plunger, the hay being forced into the compression-chamber through a feed-opening by means of a rocking feeder actuated by the driving mechanism which operates the plunger.

It also has to do with the tension devices by which the compression of the hay is regulated.

The principal object of my invention is to avoid the objections incident to the prior constructions and to provide an improved construction by which the driving mechanism for the plunger may be reversed without actuating the feeder and without uncoupling it, so that said driving mechanism may be reversed at pleasure without fear of damaging the machine.

Further objects of my invention are to provide new and improved means for holding the feeder in elevated position, to provide improved spring mechanism for elevating or assisting in elevating the feeder, to provide improved tension devices for regulating the compression of the hay, and to provide various other improvements which will be hereinafter described.

What I regard as new is set forth in the claims.

Figure 10:
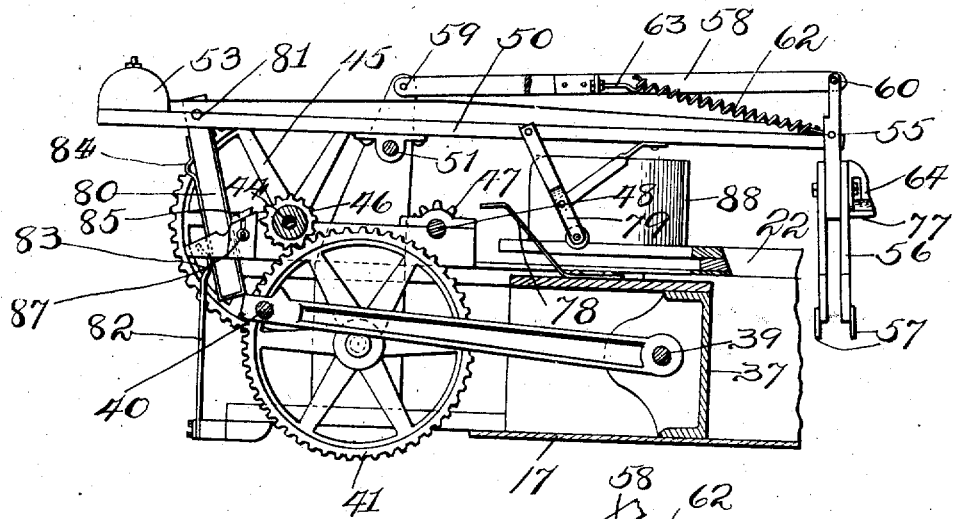
Figure 11:
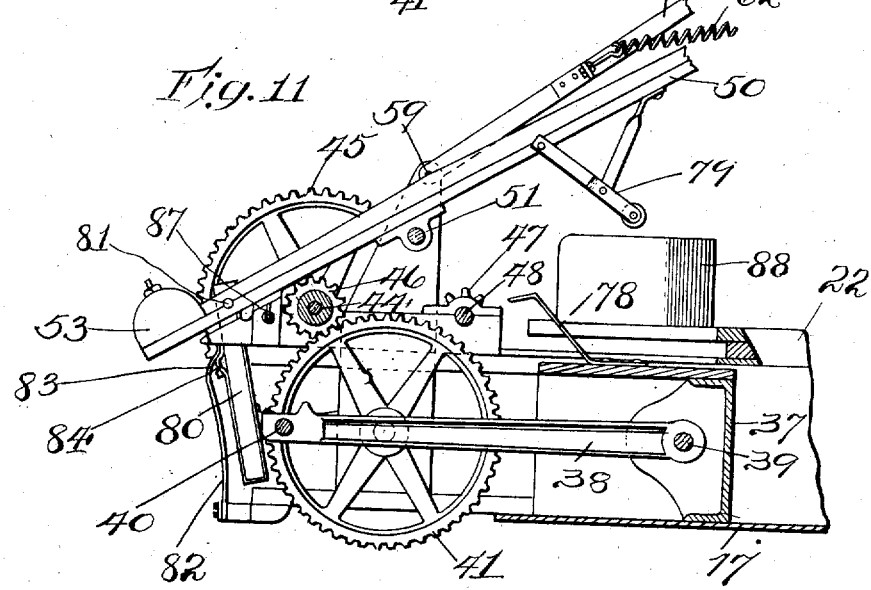

In the accompanying drawings, Figure 1 is a side elevation of my improved press. Fig. 2 is an enlarged detail, being a partial longitudinal vertical section through the front portion of the feeder and frame. Fig. 3 is a detail, being a section on line 3 3 of Fig. 1. Fig. 4 is a longitudinal section, some parts being in elevation. Fig. 5 is an end view of the device for dropping the follower-block. Fig. 6 is an end view of the parts shown in Fig. 4. Fig. 7 is a perspective view of the block-setter frame. Fig. 8 is a sectional view thereof. Fig. 9 is a perspective view of the front end of the pitman. Figs. 10 and 11 are sectional views, partly in elevation, showing different positions of the operating parts of the press. Fig. 12 is a perspective view of the delivery end of the compression-chamber, which may be termed the "baling-chamber." Fig. 13 is a partial cross-section thereof, some parts being in elevation. Fig. 14 is a perspective view of one of the wedge-blocks by which the side plates are supported and adjusted, and Fig. 15 is a perspective view of a portion of one of the side plates.

Referring to the drawings, 16 17 indicate top and bottom plates, respectively, of the frame of the press, which in the construction shown are secured to angle-irons 18 19 near the edges of said plates, as shown in Fig. 12. Said angle-irons are rigidly secured together at one end portion of the press by braces 20 or other suitable means and also by side plates 21, as shown in Figs. 1 and 4, said side plates being arranged at opposite sides of the feed-opening 22, as shown. At the outlet-end portion of the press said plates 16 17 are not fixedly secured together, but are adjustable toward and from each other to control the amount of compression which the hay receives. For convenience the baling-chamber, or that portion of the press near the rear ends of the top and bottom plates 16 17, is designated by the letter A.

As shown in Fig. 12, two U-shaped straps 23 24 are provided, one being fitted over each of said plates 16 17. Said straps are connected by bolts 25, having thumb-screws 26, preferably at their upper ends, so that by means of said thumb-screws said straps may be drawn together or permitted to separate, thus varying the friction upon the hay-moving through the baling-chamber, and consequently varying the extent of its compression. For smoothing the sides of the bale and also for providing lateral tension on the bale side plates or shoes 27 are provided at opposite sides of the baling-chamber, said shoes being carried by blocks 28 29, respectively secured to the ends of the straps 23 24 and projecting inward, as shown in Figs. 12 and 13. Said blocks are provided with central orifices 30, through which the bolts 25 pass, and in their side edges they are provided with inclined grooves 31. (Best shown in Figs. 12 and 14.) Said grooves are arranged to receive inturned lugs 32, carried by the shoes 27 near their upper and lower edges, as shown in Figs. 12 and 13. By this construction when the straps 23 24 are drawn together the blocks 28 29 approach each other, thereby causing the lugs 32 to move inward in the grooves 31, since the grooves of opposite blocks 28 29 diverge inwardly. Said blocks therefore act as wedges to force the shoes 27 inwardly against the hay, thereby increasing the lateral pressure thereupon. When by unscrewing the thumb-screw 26 the top and bottom plates 16 17 are allowed to separate, the wedge-blocks 28 29 also separate and the shoes 27 are thereby caused to move outward, reducing the tension upon the hay. It will be noted that by this construction the lateral tension varies correspondingly with the top and bottom tension.

As shown in Figs. 12 and 13, the shoes 27 are provided intermediately with a longitudinally-disposed depression or channel, as shown at 33, and, as shown at 34, said shoes are cut away at the center in order to permit of access to the baling-chamber for the purpose of tying the bale.

35 36 indicate, respectively, the front and rear wheels upon which the press is mounted.

B indicates that portion of the press in which the hay is first compressed and which for convenience will be termed the "compression-chamber."

37 indicates a plunger, which by its reciprocation compresses the hay in the compression-chamber.

38 indicates a pitman connected at its inner or rear end by a pivot 39 with the plunger 37 and at its forward or outer end by a wrist-pin 40 with a pair of drive-wheels 41, between which the pitman extends, as shown in Fig. 6. The drive-wheels 41 are mounted on studs 42, secured in the frame of the machine, as shown in Figs. 4 and 6.

43 indicates a pulley, mounted on a main drive-shaft 44, which carries a gear 45 at one side of the press, as shown in Fig. 6. The pulley 43 is connected by a belt with an engine or any other suitable source of power.

46 indicates pinions mounted on the main drive-shaft 44 and arranged to mesh with the drive-wheels 41, as shown in Figs. 4 and 6.

47 indicates a pinion which is mounted on a shaft 48, arranged parallel with the main drive-shaft 44, said pinion 47 being in mesh with the gear 45. At the opposite side of the press from the gear 45 the shaft 48 carries a balance-wheel 49, as best shown in Figs. 1 and 6. By this construction the drive-wheels 44 are driven slowly, while the wheel 49 is driven at a high rate of speed.

50 indicates the beam of the feeder, which is mounted on a pivot 51, secured between suitable uprights 52, which rise from the front portion of the press, as shown in Figs. 4 and 6, so that said beam is arranged to rock in a vertical plane over the press. The forward end of the beam 50 is provided with a counterbalance-weight 53, which assists in raising the rear end to inoperative position.

54 indicates the feeder-head, which is mounted between its ends on a pivot 55 at the rear or inner end of the beam 50, so that its angular position with reference to said beam may be varied. The head 54 is provided with downwardly-extending arms 56, which are spaced apart and are provided at their lower ends with feed-plates 57, as shown in Fig. 4 and as indicated by dotted lines in Fig. 6. Said plates are adapted to engage the hay placed above the feed-opening 22 and force it down into position to be compressed by the plunger 37.

58 indicates a swinging arm pivotally connected at its forward end by a pivot 59 with the upper end portions of the uprights 52. As shown in Fig. 6, the arm 58 is bifurcated at its forward end, so as to connect with both uprights 52. The inner or rear end of the arm 58 is connected by a pivot 60 with the upwardly-projecting end portion 61 of the head 54, as shown in Fig. 4.

It will be noted that the pivots 51 59, respectively, of the beam 50 and arm 58 are spaced apart, as are also the pivots 55 60. The result is that when the inner end of the beam 50 moves downward the head 54 is rocked on its pivot until when the beam is in a substantially horizontal position the head is substantially perpendicular thereto, as shown in Fig. 10. The head therefore enters the feed-opening 22 in a substantially vertical position, thereby forcing the hay directly down in advance of the plunger.

62 indicates springs for elevating the feeder, said springs being arranged to coöperate with the counterbalance-weight 53 to that end. As best shown in Fig. 6, there are two of the springs 62, one at each side of the arm 58, said springs being connected at one end to the rear end portion of the beam 50 and at their opposite ends to the arm 58, more or less centrally thereof. Preferably they are secured to said arm by adjustable hooks 63, as shown in Fig. 4, so that the tension of said springs may be regulated. Instead of connecting the springs to the rear end portion of the beam 50 they may be connected to the head 54. By this construction when the feeder is moved down, as in feeding the hay into the press, the springs 62 are stretched or placed under greater tension. When the feeder is released, therefore, said springs act through the head 54 and arm 58 to return the beam 50 to its uppermost position. If desired, the springs 62 may be made strong enough to make it unnecessary to use the counterbalance-weight 53; but I prefer to employ the construction shown.

64 indicates a bracket carried by and projecting rearwardly from the head 54 for dropping the follower-block 65. As best shown in Figs. 4, 7, and 8, said block is carried in a block setter or frame 66, which is fitted upon the top of the press and is adapted to slide longitudinally thereof to carry the block over the feed-opening 22. As shown in Figs. 7 and 8, said frame is composed of vertical straps 67 68, connected in the usual way by transverse straps 69 to form a rectangular frame open at the bottom and top. Side straps 70 are also preferably employed. The straps 67 are bent intermediately at right angles to provide horizontal straps 71, which run in suitable guides on the top of the press 72. If desired, the straps 71 may be made separate from the straps 67.

73 indicates braces connecting the upper straps 69 with the straps 71, as shown in Fig. 1.

74 indicates a lever for moving the block-setter frame back and forth. Said lever is preferably pivoted upon the top of the press and is connected to the block-setter frame by a link 75, as shown in Fig. 1.

As best shown in Figs. 7 and 8, the straps 68 extend up a considerable distance beyond the upper ends of the straps 67 to serve as guides to direct the follower-blocks into the frame. 76 indicates springs secured to the inner faces of one or the other of the straps 67 68 and projecting inwardly, so as to engage the follower-blocks and by their friction retain them in position until they are struck by the bracket 64. If desired, the springs 76 may be placed at the ends instead of at the sides of the block-setter frame.

It will be understood that the bracket 65 strikes the upper edge of the follower-block substantially centrally thereof and forces it down out of the setter-frame into the press. In order to protect the follower-blocks and said bracket, I provide a removable shoe 77, fitted in a suitable groove in the under surface of the bracket 64, which shoe is made, preferably, of wood, but may be made of any other suitable material. The shoe 77 projects slightly below the lower surface of the bracket 64 and is arranged to strike the follower-block. It therefore serves as a bumper to take the shock, thereby protecting both the bracket and the follower-blocks. When said shoe wears out, it may readily be removed and replaced.

78 indicates an inclined arm carried by the plunger, which engages a bracket 79, depending from the beam 50 to start the beam upward after each operation. When the feeder has been moved down to feed hay into the compression-chamber, the plunger moves to the rear, or in the direction indicated by the arrow in Fig. 4, whereupon the arm 78 strikes the bracket 79 and forces the beam upward. The beam 50 is rocked to carry the feeder-head downward by means of a swinging arm 80, pivotally connected by pivots 81 with the rear portion of the beam 50. The lower end of said arm 80 is adapted to be moved into the path of the front end of the pitman 38, so that as said pitman is carried up by the rotation of the drive-wheels 41 in the direction indicated by the arrow in Fig. 4 it will force up the front end of the beam 50, thereby rocking it on its pivot and carrying the feeder-head down into the feed-opening 22. As the arm 80 is pivoted so as to swing freely, it would normally hang in a vertical position, and as its pivot 81 lies forward of the periphery of the wheels 41 it is necessary to hold the arm 80 in an inclined position, as shown in Fig. 4, so as to cause it to intercept the pitman 38. For this purpose a spring 82 is provided, which is secured at the forward end of the machine and bears against the upper portion of the arm 80, as shown in Fig. 4. As therein shown, the upper end of the spring 82 is bent, as shown at 83, and it extends over a projection or catch 84, carried by the arm 80, as therein shown. Said spring therefore acts not only to hold the arm 80 in operative position, but also assists in holding the feeder-head in its elevated or inoperative position.

When the forward end of the pitman 38 strikes the arm 80, it forces the forward end of the feeder-beam 50 up, moving the catch 84 past the upper end of the spring 82, such movement of the feeder-beam continuing until the rotation of the wheels 41 carries the pitman out of engagement with the arm 80.

85 indicates a stop which limits the rearward movement of the arm 80 and also the height to which the feeder-head may be raised. It lies under the forward end of the beam 50 and back of the upper portion of the arm 80, as shown in Fig. 4. Said stop is vertically adjustable between guides 86 and is secured in position by a bolt 87, fitted in slots in said guides.

By pivotally connecting the arm 80 with the beam 50, as described, reverse movement of the pitman is permitted without operating the feeder and without disconnecting it, since when the drive-wheels 41 rotate in the opposite direction the forward end of the pitman simply moves aside the arm 80 when it strikes it without affecting the position of the feeder. If the arm 80 were rigidly secured in position, reverse movement of the pitman would break it.

88 indicates a shield for preventing hay from getting into that part of the machine forward of the feed-opening 22.

89 indicates a swinging plate mounted on a shaft 90, which extends transversely of the machine over the compression-chamber, as shown in Fig. 4. Said plate extends down into the compression-chamber a short distance and normally lies in a vertical position and is capable of swinging backward only. Said plate is fixedly secured to the shaft 90, which is provided at one side of the press with a crank 91, to which is connected a spring 92, the opposite end of said spring being connected to the frame of the press, as shown in Fig. 1. By this construction the spring serves to assist gravity in restoring the plate 89 to its vertical position after each reciprocation of the plunger. The function of the plate 89 is to tuck down projecting ends of hay after the plunger has been withdrawn, so that when the necessary follower-block is inserted they will be caught by it and folded in the bale.

93 indicates a series of spring-stops provided at each side of the compression-chamber, as best shown in Figs. 3 and 4. The stops 93 are provided with stems 94, which are mounted on pivots 95. Said stops extend rearwardly from their respective pivots, so that their squared ends serve to prevent the follower-blocks from returning after they have been pressed back by the plunger. 96 indicates similar stops, placed farther forward than the stops 93, for the purpose of preventing the follower-blocks from tipping forward after they are dropped into the compression-chamber. All of said stops are provided with springs 97, which press them inwardly, as shown in Fig. 3.

In practice the main drive-wheels 41 are driven continuously in the direction indicated by the arrow in Fig. 4, thereby reciprocating the plunger. Upon each return of the plunger the pitman 38 engages the arm 80, moving it upward, and consequently forcing the feeder-head down through the feed-opening 22. Prior to the descent of the head a quantity of hay is placed over the feed-opening, so that when the feeder-head descends it carries the hay into the compression-chamber. At the same time a follower-block, which has been previously moved into position, is dropped by means of the bracket 64. The plunger then moves back under the feed-opening; but before it reaches the feeder-head the feeder is forced up, carrying the head out of the way. The bale is formed in the usual way, the degree of compression being regulated by adjusting the thumb-screws 26 as described. When for any reason it is desired to rotate the drive-wheels in the opposite direction, this may be done without disconnecting any of the parts of the machine and without operating the feeder.

While I have described in detail the construction illustrated in the accompanying drawings, it will be understood that my invention is not restricted specifically to the construction shown and described, except in so far as particularly claimed, but includes, generically, the subject-matter of the broader claims.

That which I claim as my invention, and desire to secure by Letters Patent, is—

1. In a hay-press, the combination of a plunger, rotary driving mechanism for reciprocating said plunger, a rocking feeder, an arm pivotally connected with said feeder and depending therefrom, said driving mechanism being arranged to move said arm endwise when rotated in one direction to operate said feeder, and a spring secured at the forward portion of the machine adjacent to and bearing against said arm and acting to hold it yieldingly in position to be actuated by said driving mechanism.

2. In a hay-press, the combination of a plunger, rotary driving mechanism for reciprocating said plunger, a rocking feeder, an arm pivotally connected with said feeder and depending therefrom, said driving mechanism being arranged to move said arm endwise when rotated in one direction to operate said feeder, a spring secured at the forward portion of the machine adjacent to and bearing against said arm and acting to hold it yieldingly in position to be actuated by said driving mechanism, and a stop for limiting the inward movement of said arm.

3. In a hay-press, the combination of a plunger, rotary driving mechanism for reciprocating said plunger, a feeder, an arm pivotally connected with said feeder and depending therefrom, said driving mechanism being arranged to move said arm endwise when rotated in one direction, and a spring-latch coacting with said arm for holding said feeder in an elevated position.

4. In a hay-press, the combination of a plunger, rotary driving mechanism for reciprocating said plunger, a feeder, an arm pivotally connected with said feeder and depending therefrom, said driving mechanism being arranged to move said arm endwise when rotated in one direction, a suitable stop carried by said arm, and means engaging said stop for holding said feeder in an elevated position.

5. In a hay-press, the combination of a plunger, rotary driving mechanism for reciprocating said plunger, a feeder, an arm pivotally connected with said feeder and depending therefrom, said driving mechanism being arranged to move said arm endwise when rotated in one direction, a suitable stop carried by said arm, and a spring engaging said stop for holding said feeder in an elevated position.

6. In a hay-press, the combination of a plunger, rotary driving mechanism for reciprocating said plunger, a feeder, an arm pivotally connected with said feeder and depending therefrom, said driving mechanism being arranged to move said arm endwise when rotated in one direction, and a spring engaging said arm for holding said feeder in an elevated position, and acting also to hold said arm in position to be operatively engaged by said driving mechanism, substantially as described.

7. In a hay-press, the combination of a plunger, a rocking feeder, and an adjustable stop for limiting the extent to which the feeder may be rocked, substantially as described.

8. In a hay-press, the combination of means for compressing the hay, a swinging feeder, a swinging arm connected with said feeder and swinging therewith, and a spring connected with said feeder and with said arm, substantially as described.

9. In a hay-press, the combination of means for compressing the hay, a swinging feeder, a head pivotally connected therewith, a pivotally-mounted arm pivotally connected with said head, and a spring connected with said feeder and with said arm, substantially as described.

10. In a hay-press, the combination of means for compressing the hay, a feeder-head, an arm pivotally connected with said feeder-head, said arm being pivoted upon a suitable support, and a spring connected with said feeder-head and with said arm, said spring being arranged so as to have a tendency to change the angular relation of said feeder-head and arm, substantially as described.

11. In a hay-press, the combination of means for compressing the hay, a pivotally-mounted feeder-beam, a head pivotally connected with said beam, an arm pivoted at a distance from the pivot of said beam, said arm being pivotally connected with said feeder-head, and a spring for changing the angular relation of said feeder-head and arm, substantially as described.

12. In a hay-press, the combination of means for compressing the hay, a pivotally-mounted feeder-beam, a head pivotally connected with said beam, an arm pivoted at a distance from the pivot of said beam, said arm being pivotally connected with said feeder-head, and a spring connected with said arm and with the feeder, substantially as described.

13. In a hay-press, the combination of a baling-chamber, blocks having inclined grooves, shoes having means projecting into said grooves, and means for adjusting said blocks toward and from each other, substantially as described.

14. In a hay-press, the combination of a baling-chamber, U-shaped straps, blocks carried by said straps and having inclined grooves, shoes having means projecting into said grooves, and bolts for adjusting said blocks with reference to each other, substantially as described.

15. In a hay-press, the combination of a baling-chamber, a bolt, a pair of wedge-blocks mounted on said bolt and movable toward and from each other, and a shoe operatively connected with said wedge-blocks, whereby when said wedge-blocks are adjusted said shoe will be moved inward or outward to vary the tension upon the bale, substantially as described.

16. In a hay-press, the combination of a baling-chamber, wedge-blocks, means for moving said wedge-blocks toward and from each other, and a tension device operated by said blocks, substantially as described.

17. In a hay-press, the combination of a baling-chamber, a tension device adapted to engage the bale, and wedge mechanism for adjusting said tension device, substantially as described.

18. In a hay-press, the combination of means for compressing the hay, a swinging feeder, a head pivotally connected therewith, an arm pivotally connected with said head and with a suitable support, and a spring connected with said arm and with said feeder.

19. In a hay-press, the combination of means for compressing the hay, a swinging feeder, a feeder-head pivotally connected therewith, and an arm connected with said head and with a suitable support and lying at an angle with said feeder for angularly adjusting said head with reference to said feeder, substantially as described.

20. In a hay-press, the combination of means for compressing the hay, a swinging feeder, a feeder-head pivotally connected therewith, an arm connected with said head and with a suitable support and lying at an angle with said feeder and a spring for angularly adjusting said head with reference to said feeder, substantially as described.

BYRON C. BRADLEY.

Witnesses:
F. W. BICKNELL,
W. R. BOND.